Patented Apr. 22, 1924.

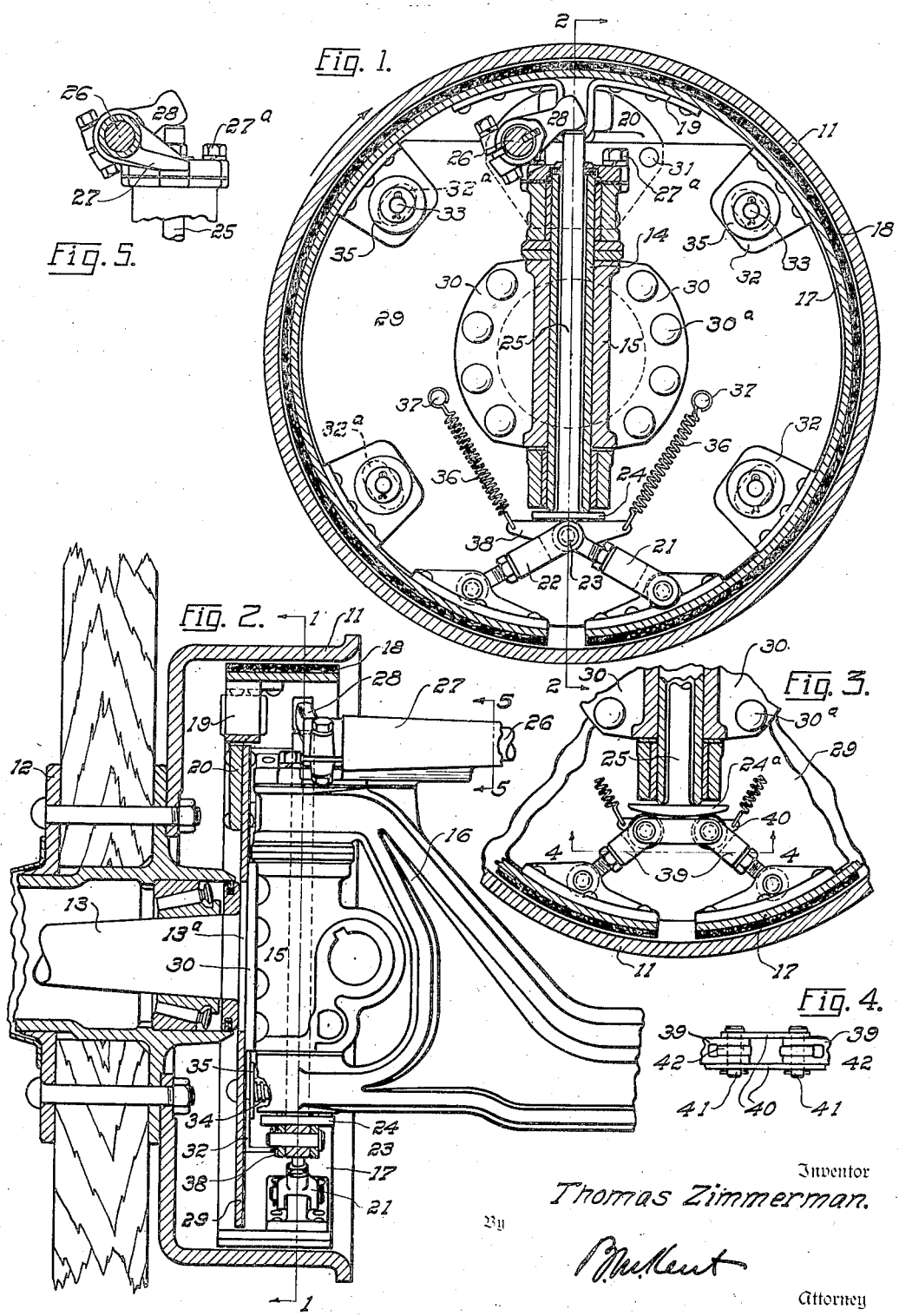

1,491,125

UNITED STATES PATENT OFFICE.

THOMAS ZIMMERMAN, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO.

BRAKE.

Application filed May 16, 1919. Serial No. 297,683.

*To all whom it may concern:*

Be it known that I, THOMAS ZIMMERMAN, a citizen of the United States, and a resident of Cleveland, county of Cuyahoga, State of Ohio, have invented certain new and useful Improvements in Brakes, of which the following is a specification.

This invention relates to brake mechanism for motor vehicles and more particularly to brakes for wheels which are pivotally supported upon a motor vehicle axle so that they may be used for steering the vehicle.

One of the objects of the invention is to provide such a construction that the operation of the brake will be unaffected by the steering movements of the wheel.

Other objects and features of novelty will be apparent from the following description, taken in connection with the accompanying drawings, in which:

Figure 1 is a vertical section through a a brake drum, a steering knuckle and the end of the yoke on which it is supported, and showing a structure embodying my invention, the section being taken on the line 1—1 of Figure 2;

Figure 2 is a vertical section on line 2—2 in Figure 1, certain parts being shown in elevation;

Figure 3 is a fragmentary vertical section similar to Figure 1 but showing a modified structure;

Figure 4 is a fragmentary bottom plan view on the line 4—4 of Figure 3, of details of the modified structure; and Figure 5 is a fragmentary view in elevation of parts as seen from the line 5—5 of Figure 2, the brake operating shaft and its bracket being shown in section.

Referring to the form of the invention illustrated in Figures 1 and 2, 11 indicates a brake drum secured to the hub 12 of a motor vehicle wheel, which is mounted upon the wheel spindle 13, and is movable about the pivot pin 14, which extends through the steering knuckle 15 and the arms of the yoke 16 of a motor vehicle axle. Within the brake drum 11, I have shown a brake band 17 provided with the usual lining 18, of friction material, and further provided with an anchor clip 19, which cooperates with an anchor member 20 whereby the brake band is held from rotation. The ends of the brake band are adapted to be engaged with the brake drum 11 by the toggle links 21 and 22, which are pivoted at one end to the brake band and have their inner ends pivotally connected together by a pin 23, the connected ends being engaged by, but not connected to, a head 24 which is formed on the plunger 25. The pivot pin 14 is of tubular form, and the plunger 25 is slidably mounted therein so that the axis of the plunger and the axis of the pin coincide.

A brake operating shaft 26 is supported in the bracket 27, which is secured upon the upper arm of the yoke 16 by screws 27ª and may be actuated by suitable lever mechanism carried by the body of the vehicle. At one end, the shaft 26 carries a lever arm 28 which has its free end positioned so as to operatively engage the end of the plunger 25. An anchor plate 29 is fitted upon the circular shoulder 13ª at the base of the spindle 13 and is secured to the lateral flanges 30 formed on the steering knuckle 15, by rivets 30ª or in any other suitable manner, and to this anchor plate, the anchor member 20 is secured, by rivets 31. Clips 32 are secured to the brake band 17 at spaced intervals and hold the brake band axially, being pressed against the anchor plate 29, by springs 34 on the studs 33 which project from the anchor plate 29, the springs 34 being arranged between the washers 35 upon each of the studs 33. Circumferentially elongated slots 32ª in the clips 32 provide for the necessary circumferential and radial movement of the brake band 17. Springs 36 are provided to normally hold the brake band 17 and the plunger 25 in retracted position, being connected at one end to studs 37 on the anchor plate 29 and at the other end to the plate 38 which is carried by the pin 23, and as the points of attachment of the springs to the plate 38 are farther from the anchor plate 29 than are the points of attachment to the studs 37, the springs will tend to resiliently hold the toggle links toward the anchor plate 29 and prevent rattling.

If the shaft 26 is rotated so that the lever 28 will force the plunger 25 downwardly, the head 24 of the plunger, through its engagement with the connected ends of the toggle links 21 and 22, moves the ends of the brake band against the drum. If, when the brake is thus applied, the brake drum 11 is moving in the direction of the arrow in Figure 1, the application of the brake band to the drum will cause the band to rotate slightly in the same direction, and the connected ends of the toggle links 21 and 22 will move toward the left across the face of the head 24. As the lower surface of the head 24 is a plane normal to the axis of the plunger 25, and determines the path of motion of the inner ends of the toggle links, and the toggle links tend to move with the brake band in a path converging toward this plane surface on the head 24, this movement of the toggle links 21 and 22 toward the left has the effect of automatically increasing the pressure with which the ends of the brake band are applied to the drum, and, consequently, increasing the braking effect.

In the modification shown in Figures 3 and 4, a pair of toggle links 39 are provided, each being connected at one end to the brake band and having their inner ends connected by links 40 and pins 41. Springs 36 are attached to one of the links 40 for retracting the toggle links 39 and the plunger 25 and preventing rattling of the parts. The connected ends of the toggle links 39 are bifurcated and rollers 42 are mounted in the bifurcations and upon the pins 41, the rollers having a slightly greater diameter than the ends of the toggle links. The plunger 25 is provided with a head 24ª the terminal face of which is concentric with the interior braking surface 18 of the drum 11. By the use of the rollers 42, the friction between the plunger 25 and the toggle links is greatly reduced and as, when the brake is applied, the rollers 42, on account of contacting with the head 24ª, and the toggle links 39 all tend to rotate about the same center, the braking effect can be regulated by the force applied to the plunger 25 and a smoothly acting brake obtained.

Since the plunger 25 is mounted axially in the pivot pin 14, about which the steering movement of the wheel occurs, the position of the plunger and the brake mechanism operated thereby will be unaffected by such movement. The plunger 25 is free to rotate about its axis relatively to the brake mechanism and relatively to the lever 28, and the lever 28 is offset, as shown in Figure 2, to contact at all times with the end of the plunger 25 and at the same time permit a maximum steering movement of the wheel before the anchor plate 29 or the anchor clip 19 will strike the lever 28 or the shaft 26 on which it is carried.

By supporting the shaft 26 in a single bracket 27, secured on the upper arm of the anchor yoke, a rigid mounting is obtained, without weakening the axle.

Having thus described my invention, what I claim is:

1. In brake mechanism of the class described, the combination of a brake drum, a brake band, and operating means for engaging said brake band with said drum, comprising a plunger having a head thereon, and means, operable by said head, for actuating said brake band and movable with said band circumferentially to contact with said head at different points as the brake band moves circumferentially with said drum.

2. In brake mechanism of the class described, the combination of a brake drum, a brake band, and operating means for engaging said brake band with said drum, comprising a pair of toggle links cooperating at one end with the brake band and having their other ends connected, and a plunger arranged for endwise movement and having a head thereon cooperating with said toggle links, the connected ends of said links being movable on said head as said brake band moves circumferentially with said drum.

3. In brake mechanism of the class described, the combination of a brake drum, a brake band, and operating means for engaging said brake band with said drum, comprising a plunger and toggle links connected at their inner ends and pivoted at their outer ends to the ends of the brake band and movable circumferentially therewith, said plunger cooperating with said toggle links and having a terminal face on which the inner ends of the said links move, disposed in converging relation to the path of motion of the outer ends of the links circumferentially of said drum.

4. In brake mechanism of the class described, the combination of a brake drum, a brake band, and operating means for engaging said brake band with said drum, comprising a pair of toggle links having their inner ends connected, and pivotally attached at their outer ends to the brake band, and a plunger arranged for endwise movement and adapted to cooperate with said connected ends of the links and having a flat terminal face normal to the axis of the plunger.

5. In brake mechanism of the class described, the combination of a brake drum, a brake band, and operating means for engaging said brake band with said drum, comprising a pair of toggle links having their inner ends connected, and their outer ends pivotally attached to the brake band, and a plunger having a head thereon cooperating with said toggle links, the connected ends of said links being movable circumferentially with said brake band relatively to said head, and resilient means cooperating with said toggle links for normally holding said plunger in retracted position.

6. In brake mechanism of the class described, the combination of an axle, a spindle pivotally connected thereto, one of said parts having a yoke and the other having a knuckle between the arms of said yoke, a pivot pin mounted in said arms and said knuckle, a wheel and a brake drum carried thereby mounted on said spindle, a brake, and operating means for engaging said brake with the brake drum, comprising a member movable radially of said drum and toggle links connected to the brake, said toggle links being movable on said member and being operated thereby.

7. In brake mechanism of the class described, the combination of an axle, a spindle pivotally connected thereto, one of said parts having a yoke and the other having a knuckle between the arms of said yoke, a wheel and a brake drum carried thereby mounted on said spindle, a brake, and operating means for engaging said brake with the brake drum, comprising a plunger extending axially of said pivotal connection and having a head thereon, and means cooperating with said head for actuating said brake and movable with the brake to different positions on said head as the brake band moves circumferentially with the drum.

8. In brake mechanism of the class described, the combination of an axle, a spindle pivotally connected thereto, one of said parts having a yoke and the other having a knuckle between the arms of said yoke, a wheel and a brake drum carried thereby mounted on said spindle, a brake, and operating means for engaging said brake with the brake drum, comprising toggle links connected to said brake and movable circumferentially therewith, and a member cooperating with said toggle links and having a surface on which the inner ends of said toggle links move as said brake moves circumferentially with said drum.

9. In brake mechanism of the class described, the combination of an axle, a wheel spindle pivotally connected thereto, a wheel and a brake drum carried thereby rotatably mounted on said spindle, an anchor plate carried by said spindle, a brake, means for engaging said brake with said drum, and means for holding said brake axially in position relative to said anchor disc comprising a plurality of members secured to said brake, and held by said disc from movement in one direction, and means for resiliently holding said members against movement relatively to said anchor plate in the opposite direction.

10. In brake mechanism of the class described, the combination of an axle, a wheel spindle pivotally connected thereto, a wheel rotatably mounted on said spindle, a brake drum carried by said wheel, an anchor plate carried by said spindle, a brake carried by said disc, means for engaging said brake with said drum, a plurality of clips secured to said brake, and resilient means engaging said clips with said anchor plate.

11. In brake mechanism of the class described, the combination of a vehicle wheel, a brake drum rotatable therewith, an anchor plate, a brake carried by said plate, clips secured to said brake, and means for normally holding said clips against axial movement relatively to said anchor plate, comprising studs projecting from one of said members, and extending through openings in the other of said members, and springs on said studs.

12. In brake mechanism of the class described, the combination of a vehicle wheel, a brake drum rotatable therewith, an anchor plate, a brake carried by said plate, and holding means comprising studs projecting from said anchor plate and clips secured to the brake and having openings therein through which said studs extend, said clips being movable radially and circumferentially of said drum but being held by said anchor plate from movement axially of the drum in one direction, and resilient means cooperating with said studs to hold said clips from movement in the opposite direction.

13. In brake mechanism of the class described, the combination of a vehicle wheel, a brake drum rotatable therewith, an anchor plate, a brake adapted to be engaged with said drum, and means on said brake and said anchor plate cooperating to resiliently hold said brake in position axially in said drum but permitting movement thereof radially and circumferentially in said drum.

14. In brake mechanism of the class described, the combination of a wheel spindle pivotally connected to an axle, a wheel mounted on said spindle, a brake drum movable with said wheel, an anchor plate carried by said spindle, a brake within said drum and adapted to be engaged therewith, clips secured to said brake, studs rigid with said anchor plate and extending through said clips, and means cooperating with said studs and said clips for normally holding said clips and said anchor plate against relative movement axially.

15. In brake mechanism of the class described, the combination of an axle, a wheel spindle pivotally connected thereto, a wheel rotatably mounted on said spindle, a brake drum carried by said wheel, an anchor plate carried by said spindle, a brake, an anchor member rigid with said anchor plate, means secured to said brake and adapted to cooperate with said anchor member to prevent circumferential movement of the brake, and means on said brake and said anchor plate cooperating to resiliently hold said brake in position axially in said drum.

16. In brake mechanism of the class described, the combination of a vehicle wheel, a brake drum carried by said wheel, an anchor plate, a brake, cooperating means carried by said anchor plate and said brake to prevent circumferential movement of said brake, clips secured to said brake, and means for normally holding said clips against axial movement relative to said anchor plate, comprising studs projecting from one of said members and extending through the other of said members, and resilient means cooperating with each of said studs and the member through which it extends.

17. In brake mechanism of the class described, the combination of an axle having a yoke, a wheel spindle having a knuckle thereon between the arms of said yoke, a pivot pin mounted in said arms and said knuckle, a wheel and a brake drum carried thereby rotatably mounted on said spindle, an anchor plate carried by said spindle, a brake carried by said anchor plate and adapted to be engaged with said drum, brake operating mechanism comprising a plunger movable axially of said pivot pin and toggle links with which said plunger cooperates, and resilient means cooperating with said anchor disc and said toggle links to normally hold said plunger in retracted position.

18. In brake mechanism of the class described, the combination of an axle having a yoke, a wheel spindle having a knuckle thereon between the arms of said yoke, a pivot pin mounted in said arms and said knuckle, a wheel rotatably mounted on said spindle, a brake for said wheel, brake operating mechanism comprising a plunger extending axially through said pivot pin and toggle links with which said plunger cooperates, and resilient means to normally hold said plunger and said toggle links in retracted position.

19. In brake mechanism of the class described, the combination of an axle, a wheel rotatably mounted on said axle, an anchor plate carried by said axle, a brake for said wheel, brake operating mechanism comprising toggle links connected at their outer ends to said brake, resilient means for holding the inner ends of said toggle links toward said anchor plate, clips rigid with said brake, and resilient means for holding said clips against axial movement relative to said anchor plate.

20. In brake mechanism of the class described, the combination of an axle, a wheel rotatably mounted on said axle, an anchor plate carried by said axle, a brake for said wheel, brake operating mechanism comprising a plunger and toggle links cooperating with said plunger and connected at their outer ends to said brake, and resilient means for holding said toggle links and said plunger in retracted position and the inner ends of said toggle links toward said anchor plate.

21. In combination, an axle having a yoke at its end, a steering knuckle cooperating therewith, a hollow bolt connecting the yoke and the knuckle, a brake drum, an expansible brake therein, a rod passing through the bolt, links connecting the rod and the ends of the brake, said rod and links lying the general plane of the brake drum, substantially as set forth.

22. In brake mechanism of the class described, the combination of a brake drum, a brake cooperating therewith, operating means for engaging said brake with said drum comprising a pair of toggle links each having one end connected with said brake, a plunger arranged for endwise movement to actuate said toggle links, and a member to which the inner ends of said toggle links are connected.

23. In brake mechanism of the class described, the combination of a brake drum, a brake cooperating therewith, operating means for engaging said brake with said drum comprising a pair of toggle links each having its outer end connected with the brake band, a plunger arranged for endwise movement to actuate the toggle links, and means to which the inner ends of said toggle links are pivotally connected and which serves as an operative connection between the links and said plunger permitting movement of the links transversely of the axis of the plunger.

24. In brake mechanism, the combination of an axle, a steering spindle, a hollow bolt pivotally connecting said spindle and said axle, a wheel rotatable on said spindle, a brake drum secured to said wheel, a brake cooperating with said drum, operating means for engaging said brake with said drum comprising a pair of toggle links each having one end connected with said brake, a plunger arranged in said bolt and movable axially thereof, there being connecting means between the inner ends of said toggle links and said plunger, and spring means for retracting said plunger and toggle links and withdrawing said brake from said drum.

In testimony whereof I affix my signature.

THOMAS ZIMMERMAN.